US010738954B2

(12) United States Patent
Bruls et al.

(10) Patent No.: US 10,738,954 B2
(45) Date of Patent: Aug. 11, 2020

(54) METHOD AND DEVICE PROVIDING CINEMATOGRAPHIC LIGHT EFFECTS IN A LAMINAR OR LOW-TURBULENT LIQUID FLOW JET

(71) Applicants: Georgius Josephus Cyrillus Ludovicus Bruls, Frankfurt am Main (DE); Laurens René Antonius Kessener, EC Valkenswaard (NL); Herman Paulus Maria Kessener, JH Nijmegen (NL)

(72) Inventors: Georgius Josephus Cyrillus Ludovicus Bruls, Frankfurt am Main (DE); Laurens René Antonius Kessener, EC Valkenswaard (NL); Herman Paulus Maria Kessener, JH Nijmegen (NL)

( * ) Notice: Subject to any disclaimer, the term of this patent is extended or adjusted under 35 U.S.C. 154(b) by 166 days.

(21) Appl. No.: 15/864,805

(22) Filed: Jan. 8, 2018

(65) Prior Publication Data

US 2018/0128439 A1 May 10, 2018

Related U.S. Application Data

(63) Continuation of application No. PCT/IB2016/000954, filed on Jul. 5, 2016.

(30) Foreign Application Priority Data

Jul. 7, 2015 (NL) ...................................... 1041393

(51) Int. Cl.
*F21S 10/00* (2006.01)
*B05B 12/08* (2006.01)
(Continued)

(52) U.S. Cl.
CPC .............. *F21S 10/002* (2013.01); *B05B 1/26* (2013.01); *B05B 12/02* (2013.01); *B05B 12/085* (2013.01);
(Continued)

(58) Field of Classification Search
CPC ....... F21S 10/002; F21S 10/005; B05B 17/08; B05B 17/085; B05B 1/26; B05B 12/02;
(Continued)

(56) References Cited

U.S. PATENT DOCUMENTS 5,171,429 A * 12/1992 Yasuo .................. E03C 1/0404 116/202
9,492,834 B1 * 11/2016 Bishel ..................... B05B 15/68
(Continued)

OTHER PUBLICATIONS

International Search Report and Written Opinion of the IB dated Jul. 3, 2017.

*Primary Examiner* — Alan B Cariaso

(57) ABSTRACT

The present invention refers to a method for providing a liquid display displaying a selectable pattern (20-29, 45-48, 58-62) wherein a) either light rays (8, 79) emitted by a first emitter are characterized by at least one light parameter, with the light parameter being defined
by a first light parameter defining the light rays (8, 79) as such, like the frequency and/or amplitude of the light, and/or
by a second light parameter defining the emission of the light rays (8, 79), like the location, repetition rate, width and/or form of emission pulses of the light rays (8, 79), and
light deflecting means (17-19, 39-43, 60-62, 82) emitted by a second emitter depend on the light parameter such that the emitted light deflecting means (17-19, 39-43, 60-62, 82) are tuned to the emitted light rays (8, 79) to create cinematographic light effects, b) or the light deflecting means (17-19, 39-43, 60-62, 82) emitted by the second emitter are characterized by at least one deflecting parameter, with the deflecting parameter being defined (Continued)

by a first deflecting parameter defining the characteristics of the deflecting means (17-19, 39-43, 60-62, 82) as such, like the material size, geometry, weight, amount, density, velocity, acceleration and/or kind of gas or solid material, and/or by a second deflecting parameter defining the emission of the deflecting means (17-19, 39-43, 60-62, 82), like the location, repetition rate, width and/or form of emission pulses of the light deflecting means (17-19, 39-43, 60-62), and the light rays (8, 79) emitter by the first emitter depending on the deflecting parameter such that the emitted light rays (8, 79) are tuned to the emitted light deflecting means (17-19, 39-43, 60-62) to create cinematographic light effects.

18 Claims, 5 Drawing Sheets

(51) Int. Cl.

| | |
|---|---|
| ***B05B 17/08*** | (2006.01) |
| ***G06F 13/24*** | (2006.01) |
| ***B05B 12/12*** | (2006.01) |
| ***F21V 33/00*** | (2006.01) |
| ***B05B 1/26*** | (2006.01) |
| ***B05B 12/02*** | (2006.01) |
| ***G09F 13/24*** | (2006.01) |
| *F21V 29/70* | (2015.01) |
| *F21W 121/02* | (2006.01) |
| *F21Y 115/10* | (2016.01) |
| *F21Y 115/30* | (2016.01) |
| *F21Y 113/17* | (2016.01) |
| *F21Y 113/13* | (2016.01) |

(52) U.S. Cl.

CPC ............ *B05B 12/12* (2013.01); *B05B 17/085* (2013.01); *F21V 33/004* (2013.01); *G09F 13/24* (2013.01); *F21S 10/005* (2013.01); *F21V 29/70* (2015.01); *F21W 2121/02* (2013.01); *F21Y 2113/13* (2016.08); *F21Y 2113/17* (2016.08); *F21Y 2115/10* (2016.08); *F21Y 2115/30* (2016.08)

(58) Field of Classification Search

CPC ....... B05B 12/085; B05B 12/12; G09F 13/24; F21W 2121/02; F21V 33/004

USPC ....... 40/406, 407, 439, 441; 362/96; 239/18, 239/20

See application file for complete search history.

(56) References Cited

U.S. PATENT DOCUMENTS

| | | | | |
|---|---|---|---|---|
| 2007/0008713 A1* | 1/2007 | Doyle | B05B 15/00 | 362/101 |
| 2008/0271795 A1* | 11/2008 | Buhlmann | B05B 1/18 | 137/551 |
| 2010/0276508 A1* | 11/2010 | Davies | B05B 17/08 | 239/18 |
| 2011/0042489 A1* | 2/2011 | Johnson | B05B 17/06 | 239/407 |
| 2011/0073670 A1* | 3/2011 | Johnson | B05B 1/34 | 239/18 |

* cited by examiner

METHOD AND DEVICE PROVIDING CINEMATOGRAPHIC LIGHT EFFECTS IN A LAMINAR OR LOW-TURBULENT LIQUID FLOW JET

CROSS-REFERENCE TO RELATED APPLICATIONS

This application is a continuation of International Patent Application No. PCT/IB2016/000954, filed Jul. 5, 2016, which claims the benefit of foreign priority to the Netherlands Patent Application No. NL 1041393, filed Jul. 7, 2015, each of which is incorporated herein by reference in its entirety for all purposes.

BACKGROUND OF THE INVENTION

1. Field of the Invention

The following description relates to a method and a device for providing a liquid display displaying a selectable pattern. For example, the creation of light effects in liquid streams emerging from outlets into ambient atmosphere such as in ornamental fountains and water displays, household water taps, water faucets and water spouts, beverage dispensers and the like, is described.

2. Description of the Prior Art

Illumination of liquid streams is known from the state of the art for instance of ornamental water fountains and water displays, household taps and bathroom faucets as well as beverage dispensers. For ornamental water fountains illumination from the outside is known whereby light from usually hidden light sources is directed from the outside onto the fountains and is reflected by water streams emerging from said fountains to become visible for the onlooker. It is also known from the state of the art to generate light effects by locating a light source next to the water outlet of the housing through which water flows, as described for example in the GB2099125A. Furthermore it is known that, by creating a glass-like jet of a laminar or low turbulent water stream, said stream can be internally lighted, the light inside such stream made visible for the onlooker by various methods resulting in a spectacular display as for instance described in U.S. Pat. Nos. 7,818,826, 4,749,126, 4,901,922, WO001985005167A1, U.S. Pat. Nos. 5,160,086, 5,115,973, 6,543,925, 7,845,579, 7,818,826. One method to improve the visibility of the light from glass-like rods of laminar flow water streams is described in U.S. Pat. No. 7,845,579 applying a stream interrupter, 'thumpers' or 'scratchers', to locally disturb the laminar flow of the water stream causing light to escape from the water stream at such disturbance moving with the water stream and become visible to the onlooker. Patent application US20110042489 describes a further improvement of the visibility of the light radiating from glass-like rods of laminar flow water streams by introducing an 'illumination enhancer' by means of an additive supply element that provides a small and controlled stream of water into the laminar flow water stream at the outlet. This additive water stream causes a controlled and continuous ripple or wave effect in the outer surface of the glass-rod like water stream that makes it radiate light along its length. Introduction of elements such as air or gas to create small gas bubbles into the laminar flow water stream to enhance the visibility of the light is also described in US20110042489, which method was already known from U.S. Pat. Nos. 4,749,126 and 4,901,922.

Furthermore, U.S. Pat. No. 5,171,429 proposes an device for discharging water wherein light is directed to the outlet so as to visually identify characteristics of water. The described device includes sensors for sensing characteristics of water and a light emitting device such as a light emitting diode (LED) for emitting light. It is known from DE102004017736B3 to introduce colored light to water emerging from a tap in order to represent the temperature range of the water by using LED's, so that a user can detect the temperature range easily by vision. US20040258567A1 discloses a plumbing fixture to monitor and dispense an illuminated fluid stream, as for instance emerging from a water faucet. The fixture includes a sensor and a processing unit coupled with a sensor for monitoring the water condition. A light source coupled to the processing unit and directing light into the fluid, is activated to make the water condition visible to the user. US2010012208A1 describes a water saving device for installing on a spout or faucet with a light-emitting element directing colored light into the water flow.

A laminar flow water jet system according to US 2011/0073670 A1 has a housing with a water channel, the housing creating a laminar flow in the water channel from the water flowing through the housing. A lighting element is provided with a controller. The laminar flow passes through at least one jetting element having a cup portion and a nozzle portion and jetting a laminar flow tube from the laminar flow passing through the water channel in the housing at the base portion. The laminar flow tube is ejected from the nozzle as a laminar flow jet having a smoothed tubular surface jacket and being lit by the lighting element. An additive source drips additive into the cup portion at a rate controlled by the controller, the additive being absorbed by capillary action by the laminar flow tube as it is passed through the nozzle to become the laminar flow jet. The absorption process, which causes disruption of the smoothed tubular surface jacket and/or draws in air from the surrounding atmosphere creating perturbations and/or bubbles within the laminar flow tube, is rather complicated and unpredictable.

A furher fluid jetting device as known from JP-2004-188351 A is provided with a turbulence generation means for generating turbulence at a part of the surface of a fountain jet. To put it concretely, a dropping nozzle is connected through a discharge pipe to the discharge side of a pulse pump and the dropping port of the dropping nozzle is arranged near the downstream side opening part of a nozzle. Then, water drops are dropped from the dropping nozzle to the surface of a laminar flow jet of a fountain at a prescribed timing by the drive of the pulse pump. By dropping the water drops, a high luminance part is partially formed on the surface of the laminar flow jet, the high luminance part moving with the flow of the laminar flow jet. Thus, by adjusting the dropping timing of the water drops, a fountain jet full of changes is produced.

SUMMARY OF THE INVENTION

In an aspect, a simple method and device for providing a liquid display displaying a selectable pattern is provided. In particular, to create new light effects in a liquid stream, in particular but not exclusively in laminar or low turbulent liquid streams, emerging from an outlet into ambient atmosphere allowing even a stationary display of the selected pattern.

In another aspect, a method for providing a liquid display displaying a selectable pattern by selecting a pattern is provided. The method is provided by generating an adjustable liquid stream defined by a boundary along its path, and by emitting light rays and light deflecting means into said liquid stream along its path and depending on the selected pattern such that each light ray within the liquid stream is guided by total reflection at the boundary of said liquid stream until impacting a light deflecting means by which the light ray is deflected in order to leave the liquid stream as deflected light rays, and that the deflected light rays form the selected pattern where either the light rays are characterized by at least one light parameter, with the light parameter being defined by a first light parameter defining the light rays as such, like the frequency and/or amplitude of the light, and/or by a second light parameter defining the emission of the light rays, like the location, repetition rate, width and/or form of emission pulses of the light rays, and the light deflecting means depend on the light parameter such that the emitted light deflecting means are tuned to the emitted light rays to create cinematographic light effects, or the light deflecting means are characterized by at least one deflecting parameter, with the deflecting parameter being defined by a first deflecting parameter defining the deflecting means as such, like the material size, geometry, weight, amount, density, velocity, acceleration and/or kind of gas or solid material, and/or by a second deflecting parameter defining the emission of the deflecting means, like the location, repetition rate, width and/or form of emission pulses of the light deflecting means, and the light rays depending on the deflecting parameter such that the emitted light rays are tuned to the emitted light deflecting means to create cinematographic light effects.

It is preferred that the liquid stream is generated as a substantial laminar flow liquid stream or low turbulent liquid stream, preferably in form of a water stream, and/or the liquid stream is characterized by at least one liquid parameter, with the light rays and/or light deflecting means depending on the liquid parameter.

The liquid parameter can be adjustable and/or selectable, and/or the liquid parameter can be defined by the liquid flow rate, the liquid temperature, the pH value of the liquid, the content of chemical or organic substances within the liquid, for instance calcium carbonates, or of solid particles or micro organisms, and/or the kind of liquid.

Also the light parameter can be adjustable and/or selectable, and/or the deflecting parameter can be adjustable and/or selectable.

With the invention it is proposed that at least one first emitter emits the light rays in form of series of light packets, preferably said series of light packets consisting of two or more sequential light pulses with different light parameters, of which in particular at least one light pulse has an intensity greater than zero and at least one of said light pulses has a color and/or intensity different from the other light pulse(s).

Further it is proposed that at least one second emitter emits light deflecting means, in particular including gas bubbles and/or particles in the form of series of packets, preferably said series of light deflecting means packets consisting of two or more sequential light deflecting means pulses differing with respect to their deflecting parameters.

It is preferred that the first and the second emitters are synchronized.

The pattern can be selected manually or automatically, preferably depending on at least one environment parameter being characteristic for the environment, like the lighting conditions, weather conditions, temperature of ambient atmosphere, atmospheric pressure, wind speed, pollution, sounds, noise levels or the like, or for information about the location, presence, or movement of physical bodies or persons, or for a time, like the time of day, the week, the month, the year, the season or the like, or for information, like stock exchange data, rise or fall of a stock exchange index like Dow Jones, DAX, or AEX or the like.

The following description also provides a device for providing a liquid display, including at least one liquid outlet, preferably including a water faucet, a plumbing fixture, an ornamental fountain or ornamental water display and/or a first controllable conditioning means, at least one light emitter, preferably including one or more Light Emitting Diodes (LEDs), or one or more multi coloured LEDs, e.g. a RGB-LED, or one or more laser diodes and/or an array of light emitters and/or second controllable conditioning means, at least one emitter of light deflecting means, preferably including a third controllable conditioning means, an input device and a control unit coupled to the liquid outlet, the light emitter, the emitter of light deflecting means and the input device and adapted to provide the liquid display displaying a selectable pattern with a method according to one of the preceding claims.

The first conditioning means can comprise at least one first nozzle, valve, filter, baffle and/or synchronizing means, and/or the second conditioning means can comprise at least one second filter, optic element, chopper and/or synchronizing means, and/or the third conditioning means can comprises at least one third valve, filter, shutter and/or synchronizing means.

Device according to invention preferably further comprise at least one first sensor for determining the light parameter, and/or at least one second sensor for determining the deflecting parameter, and/or at least one third sensor for determining the liquid parameter, and/or at least one fourth sensor for determining the environment parameter, wherein preferably the first, second, third and/or fourth sensor is connected to said control unit.

With the invention it is also proposed that the input device comprises manual switches, a keypad and/or a touch screen, and/or the input device is suited to communicate wireless, via WIFI, LAN, Bluetooth, Zigbee, smart phone and/or tablet applications (apps), and/or the input device receives data from the first, second, third and/or fourth sensor, and/or the control unit comprises a microprocessor with an interface comprised by the input device.

It is preferred according to the invention that the liquid outlet being provided at the end of a liquid guiding means determines the flow characteristic of the liquid stream, and the light emitter as well as the light deflecting means emitter are arranged to emit light and light deflecting means, respectively, within the liquid guiding means, upstream of the liquid outlet, with preferably at least one part of the light emitter and/or light deflecting means emitter being arranged inside the liquid guiding means.

Still further it is proposed that the light emitter is mounted in a housing, the housing having a wall which is at least in part transparent, the transparent wall part is providing an indenture, the indenture provides a hollow that is filled with water to act as a converging lens focusing light rays from light emitter onto a light guide.

In addition, it is preferred that the light parameter, in particular the intensity of the light rays emitted by light emitter, is controlled in dependence of the output of a light sensor, and/or the light parameter, the deflecting parameter and/or the liquid parameter, in particular determining the pattern of the light rays emitted by light emitter is controlled in dependence of the output of an infrared emitter and sensor or a capacitive sensor.

It is advantageous that the liquid guiding means has a wall which is at least in part transparent for environmental light, and the light sensor and/or the infrared emitter and sensor is/are arranged to receive environmental light through the transparent wall part.

Finally the device according to the invention can further comprise a support for the light source acting as a heat sink, with the heat generated by the light source being dissipated by water contacting the support.

According to preferred embodiments of the invention, light packets consisting of two or more individual sequential light pulses emitted by a light source are introduced into a liquid stream to be guided by said liquid stream by total internal reflection. In addition, particles of any matter or bubbles of any gas are introduced at an adjustable pace, size, and frequency into the liquid stream to move with the liquid stream, with the introduction of said particles or bubbles being preferably synchronized with the introduction of said light pulses or packets of pulses. Particles or bubbles become visible to an onlooker by light of the light packets deflected out of the liquid stream, wherein light, with the frequency of the emitted light packets being tuned to the frequency of the emerging particles or bubbles, creates cinematographic light effects. The method by means of which said light effects are created is referred to as "Sequential Pulse Modulation" (SPM) in this application.

The implementation of cinematographic light effects allows for displaying a stationary pattern, internally moving patterns, as well as patterns moving upstream or downstream inside a water jet.

Instead of dripping additives or water droplets onto a water flow jet as known in the prior art, light rays as well as light deflecting means in particular in form of air bubbles are introduced into water during or even at the jet forming thereof. This leads to a simple structure.

It is of advantage to use a 'liquid lens' in form of a sphere-like hollow deformation in a transparent (glass) wall of a housing, in which housing a light source is mounted, to bundle light into a light guide. With water streaming around this housing, water fills the hollow space such that the water filled deformation will act as a converging lens.

Preferred embodiments of the invention comprise a tap or sanitary faucet providing a support for the light source which also acts as a heat sink for the light source, as the heat produced by the light source being dissipated to water that flows through the faucet.

It is preferred to add an ambient light sensor in said tap or faucet, so that the intensity of the light pattern in the water stream can be adapted to the light circumstances in the environment, with higher intensity of the light pattern in the daytime, and less in the evening or with artificial lighting conditions. That is to prevent unpleasant blinding at night and to have the light patterns also visible in daytime.

In addition or as an alternative an IR emitter and sensor may be incorporated in the faucet such that the light pattern in the water stream can be changed by just moving for example a hand over the faucet.

BRIEF DESCRIPTION OF THE DRAWINGS

Further advantages and features of the invention are presented in the following description in which preferred embodiments are shown by the help of the enclosed schematic figures.

DETAILED DESCRIPTION OF THE INVENTION

Figure 1:
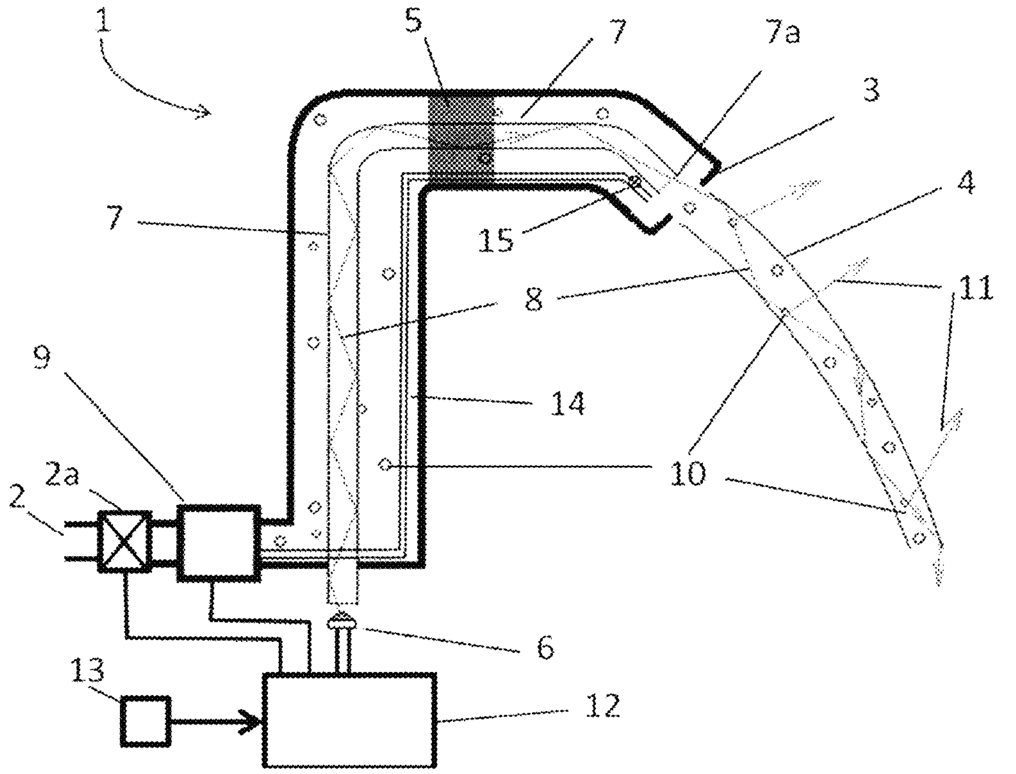
FIG. 1 is a diagram illustrating a longitudinal cross-section of a first example of a device of the invention.

FIG. 1 shows a first embodiment of a device for providing a liquid display displaying a selectable pattern in line with the invention. Said device comprises a faucet assembly with a housing 1 having at least one inlet 2 for a liquid like water, said inlet 2 includes a valve 2*a* to allow or to stop liquid to flow into housing 1, and at least one outlet 3 from which a laminar flow or low turbulent stream of liquid 4, for instance a glass like water jet, can be made to discharge into ambient atmosphere. The stream of liquid 4 may be made more laminar—or less turbulent—via a baffle 5 at a suitable position inside the housing 1. Instead of the baffle 5 one or more filters, screens, or the like, may be installed.

A light emitter or light source 6, preferably a light emitting diode (LED) or combination of LED's, e.g. a Red-Green-Blue LED or a Red-Green-Blue-Yellow LED, a Red-Green-Blue-White LED (RGB-LED or RGBY-LED or RGBW-LED), or a laser diode or a combination of laser diodes, to generate one or more colors of light, positioned outside the housing 1, emits light at least for a part in the direction of and onto one end of a conventional light guide 7. Said light guide 7 is for at least a part located inside housing 1 and guides light rays 8 from said light source 6 to the other end 7*a* of said light guide 7, which other end 7*a* functions as a light emitter inside said housing 1, emitting light into the liquid stream 4 discharging from outlet 3. Said other end 7*a* of said light guide 7 may be positioned in the proximity of said outlet 3, while any appropriate focusing elements may be interposed between the end 7*a* of the light guide 7 and the outlet 3. Said liquid stream 4 will guide said light rays 8 emitted into said liquid stream 4, for at least a part, by means of the known principle of total internal reflection.

Via an air introducing means 9 in form of an air bubble emitter air bubbles 10 are introduced into the liquid stream 4. Said means 9 may comprise a Venturi system, an air pump, a container with compressed air, or any other means to introduce air bubbles into the liquid stream 4. The air bubbles 10 may be introduced into the liquid close to, or at a distance from the liquid outlet 3. A tube 14, for instance equipped with a switched valve 15, running from the air introducing means 9 towards the outlet 3 may be suited for introducing the air bubbles 10 into said liquid stream 4 close to the outlet 3. By means of the switched valve 15 the air bubbles 10 may be introduced at a desired, stationary, intermitting, or variable frequency and of desired volume, as determined for instance by a microprocessor control device 12. Alternatively an air bubble injection system driven by a piezo element may be incorporated in said means 9 together with a micro switch 15.

The air bubbles 10 will move with the liquid in said laminar or low turbulent liquid stream 4. It is noted that said air bubbles do not tend to move within the liquid stream, for instance do not rise to the outer surface of the liquid stream, as, once in the ambient atmosphere, the liquid stream is subject to a free fall, which means that said air bubbles will stay inside the liquid stream until said liquid stream is disrupted, for instance when hitting a solid surface. The light rays 8 guided by said liquid stream 4 in ambient atmosphere will, for at least a part, be deflected by said air bubbles 10, which deflected light rays, when no longer meeting the conditions of the principle of total internal reflection, will depart from the liquid stream 4 (light rays 11) and become visible to an onlooker (not shown). Thus, the air bubbles 10 become visible to the onlooker as radiating light, said air bubbles moving with the liquid in said liquid stream 4. As an alternative to air bubbles to have light rays depart from the liquid stream to become visible to the onlooker, means like 'thumpers' or 'scratchers' as mentioned above may be applied.

The light source 6 is connected to the microprocessor control device 12, which control device determines the characteristics, as for instance color, intensity, duration, frequency, and other features, of the light ray 8 emitted by said light source 6 as well as the number, size, and frequency of air bubbles 10 that are introduced into the liquid stream 4. Instead of air bubbles, bubbles of any kind of gas—for instance carbon dioxide, nitrogen gas, helium gas, or other, or particles of any kind may be introduced into said liquid stream. Also characteristics of the action of said 'scratchers' or 'thumpers' can be determined by microprocessor control device 12.

Alternatively the light source 6 may be positioned within the housing 1 inside a lamp holder, the light source communicating with the control device 12 by means of electric wiring running for a part at least inside housing 1, with a conventional light guide interposed between the light source 6 and the outlet 3 similar as shown in FIG. 1. As a further alternative, the light source 6 may be positioned within the housing 1 close to the outlet 3, without a conventional light guide interposed between the light source 6 and the outlet 3, the light source 6 now being the light emitter, similar to the end *7a* of the light guide 7 in FIG. 1, emitting light into the liquid stream 4. As a further alternative, the light source can be integrated into the light guide, whereby the light emitter, as for instance a LED, can be fixed onto or into one end of the light guide, for instance by means of an adhesive bonding or glue. The refraction index of said adhesive bonding may be chosen such that the amount of light entering in and guided by the light guide is maximized.

The light source 6 and thus light emitter 7*a* is made to emit a number of at least two light pulses of adjustable color, duration, and intensity, which light pulses are arranged sequentially, that is one after the other, at least one of said light pulses having a intensity greater than zero, and at least one of said light pulses having a color or intensity different than the other light puls(es). Said sequentially arranged light pulses are referred to as a "light packet" in this application.

In a preferred embodiment of the invention said light emitter 6 comprises a RGB-LED, which is activated by said microprocessor control device 12 determining the sequence, color, intensity, frequency, and duration of said light pulses, which constitute said light packets. The sequence, color, intensity, frequency, and duration of said light pulses that constitute said light packets, emitted by light emitter 6, may be predetermined and/or set by external input factors of various kinds communicated to said microprocessor control device 12 via an interface 13.

The interface 13 comprises an appropriate information input-output device, which on its turn comprises for instance manual switches, wired or wireless communication systems, like a WIFI, LAN, Bluetooth, Zigbee or similar communication system, in particular for mobile phone and/or tablet applications (apps), and/or by means of sensors. The interface 13 may be incorporated in said control device 12.

Said light packets are generated repeatedly for an adjustable period and at an adjustable frequency, preferably in the range between 0 and 1000 Hertz, and more preferably between 10 and 100 Hertz, and introduced into the liquid stream 4 to be guided within the liquid stream 4. As described above, light of these light packets will be deflected out of the liquid stream 4 by the air bubbles 10 or particles moving with the liquid stream 4, which air bubbles 10 or particles become visible to the onlooker as radiating light. Said frequency determines the maximum duration of said light packets, for instance, for 50 Hertz the duration of the light packet cannot surpass 20 milliseconds. For 20 Hertz the light packets can have a duration not exceeding 50 milliseconds. If desired said microprocessor control device may also be set to activate or deactivate valve 2*a*.

Figures 2, 2A:
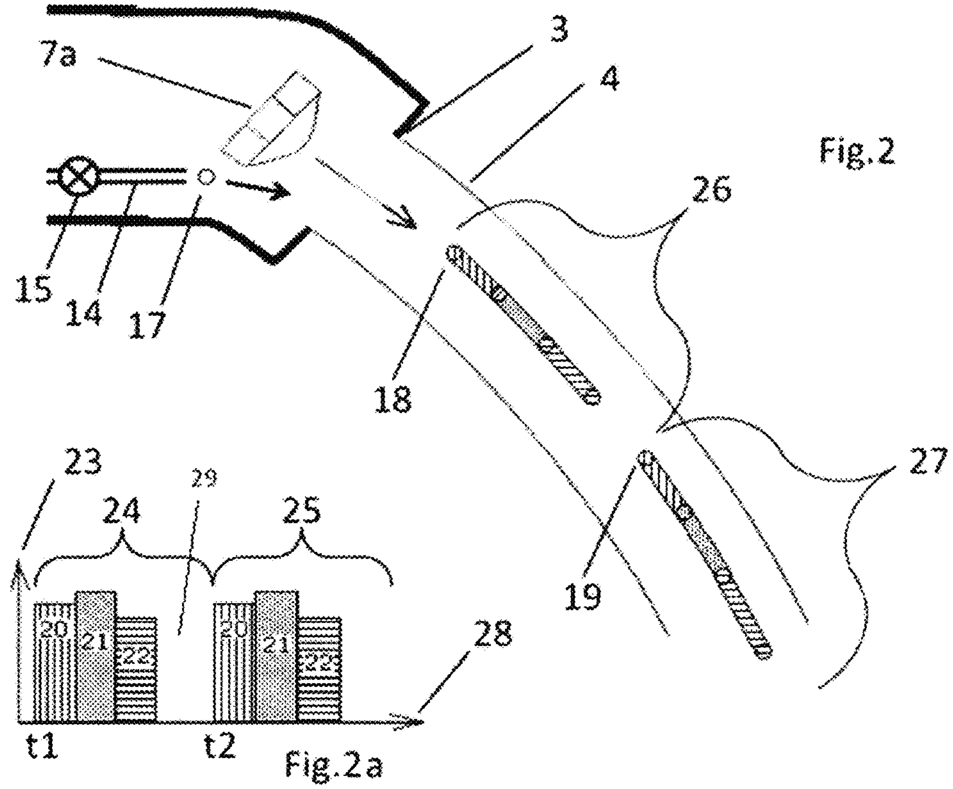
FIG. 2 is a diagram illustrating a longitudinal cross-section of a part of a second example of a device of the invention.
FIG. 2*a* is a diagram illustrating a graph depicting a light intensity versus time for a device of FIG. 2*a*.

The light effect that is generated by a method according to the invention is further illustrated with respect to FIG. 2, representing a detailed view of a liquid outlet 3 of a second embodiment of a device of the invention. From the outlet 3 a laminar or low turbulent stream 4 of liquid emerges, similar as explained with respect to FIG. 1. A light emitter 7*a* emits light packets 24, 25, at time t1 and t2, respectively, and so on, as shown in the time 28 vs intensity 23 representation in FIG. 2*a*, with each packet 24, 25 including three light pulses 20, 21 and 22 of different color, for instance red, white and blue, having for instance similar or unequal intensity and duration, followed by a pulse 29 of zero intensity. Said light packets 24, 25 are emitted with a frequency equal to 1/(t2−t1).

Light, deflected out of the liquid stream 4 for instance by an air bubble at a position 18, which air bubble 18 is, for instance, introduced into the liquid stream 4 via a tube 14 and a valve 15 as described with respect to FIG. 1, makes said air bubble 18 appear colored to the onlooker according to the color of the light pulses within the light packet 24, 25 for a certain distance within the liquid stream 4 corresponding to the duration of each individual light pulse times the local velocity v of the liquid and thus of the air bubble 18 in the liquid stream 4. Thus, the air bubble 18 will appear as a multicolored band or line 26 within the liquid stream 4, the width of said line 26 corresponding to the size of the air bubble, the length L of said line 26 corresponding to the duration of the light packet (t2−t1) times the local velocity v of liquid in the liquid stream:

$$L=v*(t2-t1).$$

The colors that appear in said multicolored line 26 are sequential along said line according to the colors of the light pulses within said light packet. After time (t2−t1) the air bubble 18 will have moved to position 19 in FIG. 2*a*, while meanwhile a new air bubble 17 emerging from the tube 14 has moved to the position 18, such that again a multi colored line 26 of similar length will appear starting at position 18, while also a multicolored line 27 will appear starting at position 19.

Introducing air bubbles at a regular pace such that multicolored lines 26 will appear repeatedly starting at—or close to—position 18 and multicolored lines 27 will appear repeatedly at position 19, and so on, a cinematographic effect is created by which line 26, 27, and so on, will, to the onlooker, appear stationary within the liquid stream 4. This will be the case for all air bubbles present in the liquid moving with the liquid stream 4, such that a multiple of stationary multi colored lines will appear within the liquid stream. Thus, by generating said light packets at a fixed but adjustable, or at a varying frequency, preferably, but not exclusively, between 0 and 1000 Hertz, and more preferably between 10 and 50 Hertz, and introducing the air bubbles at an adjustable and adjustably regular pace, and if desired adjusted to the frequency of the light packets, an effect is created which makes said colored lines appear as colored stripes, stationary, or moving at a slow or less slow pace, up or down, within the liquid stream. This combination of generating light packets, consisting of at least two sequentially arranged individual light pulses, and generating these light packets at an adjustable frequency is called "Sequential Pulse Modulation", or shortly SPM.

The combined pulses 20, 21, 22 and 29 shown in FIG. 2*a* could provide e.g. red, white, blue and no light stripes in the liquid stream to represent the national colors of the Netherlands, such that they display a pattern in form of Dutch flags. The stripes have a total length corresponding to the duration of the light packets times the local velocity of the liquid in said liquid stream, which length may amount to several centimeters. The total length of said liquid stream determines the number of said national color stripes that is displayed on the liquid stream. When, as a further example, said light packets consist of two sequential light pulses colored yellow and blue, said stationary stripes will appear yellow and blue corresponding e.g. with the national colors of Sweden. When, as a still further instance, said light packets consist of a number of light pulses colored white and red of equal duration plus a number of light pulses colored blue and white, the duration of the white pulses being very short as compared to the blue pulses, an impression of the national colors of the USA ('stars and stripes') will appear. Thus by applying SPM an endless number of light effects may be generated in said liquid stream as determined by settings of said microprocessor control device 12. This enables the display of any selected pattern.

Time dependent effects may be generated by the microprocessor control device 12, for instance by changing the duration of the individual pulses or of the light packets as a function of time or by changing the color, intensity, and other features of the light emitted into the liquid stream, or combinations of these. In case the microprocessor control device 12 is coupled to external factors of various kinds in order to set the characteristics of the SPM light packets in relation to said external factors, said external factors consisting of information generated by a user or onlooker, or of information generated by sensors to sense characteristics of the liquid such as temperature, pH value, content of chemical substances or of solid particles and the like, or of information generated by sensors to sense environmental aspects such as lighting conditions, temperature of ambient atmosphere, atmospheric pressure, sounds, noise levels, or of the location, presence, or movement of physical bodies or persons, or of weather conditions, air pollution characteristics, stock exchange data, time of day, day of the week, holidays like fourth of July, birth day, and other, and so on, a liquid stream provided by a device in line with the invention provides a display displaying light effects as generated by SPM and, thus, can constitute an information carrier, as from said light effects conclusions may be drawn by the onlooker regarding said external factors. Also, the amount, frequency, size, and pace of air bubbles introduced into the liquid stream may be determined by said external factors to the same effect. Said external input factors may be communicated to said control device by the interface 13 being any appropriate information input device 13 for instance provided with manual switches, wired or wireless communication systems, WIFI, LAN, smart phone or tablet applications (apps), and/or sensors, and other.

Figure 3:
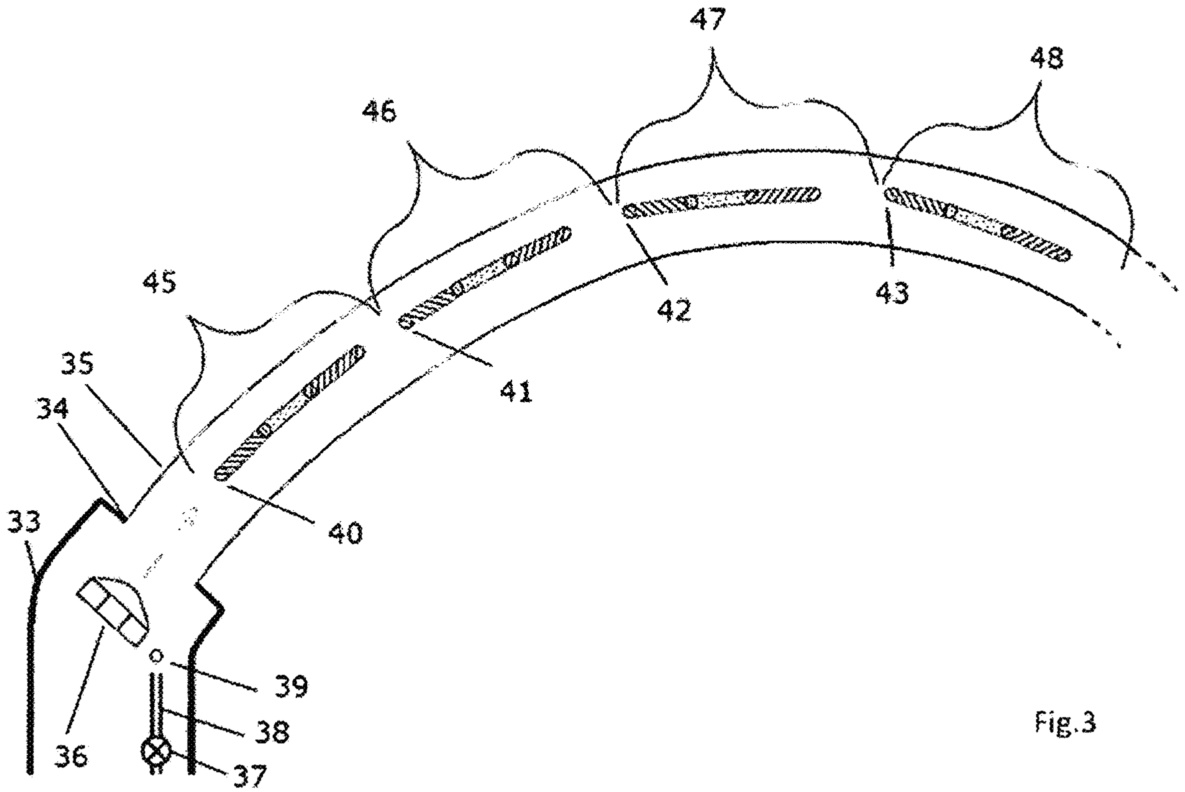
FIG. 3 is a diagram illustrating a longitudinal cross-section of a part of a third example of a device of the invention.

FIG. 3 represents another preferred embodiment of the invention, including a housing 33 having a water inlet (not shown) and a water outlet 34 producing a laminar or low turbulent stream 35 of water directed upward, meant for ornamental purposes. Such a laminar water stream for ornamental purposes is generally known from the state of the art and is for instance referred to as "jumping jet" or "glass-like jet of a laminar or low turbulent water stream" as is discussed in the introduction of this description.

Light is emitted from a light emitter 36 and guided by internal reflection inside the water stream 35. Air bubbles 39, 40, 41, 42, 43 are sequentially introduced into the liquid stream 35 from a tube 38 after passing a valve 37, one after the other, at a controlled and adjustably regular pace, close or at a distance from said outlet 34. Said air bubbles, moving with the water and deflecting light out of the stream of water, become visible to an onlooker. Said light emitter 36 is by means of a not shown microprocessor control device made to emit light packets into the stream 35 of water according to the principle of SPM as described above in relation to FIG. 1 to FIG. 2*a*. Thereby a cinematographic effect is created by which multicolored stripes will appear to the onlooker stationary or slowly or less slowly moving inside said stream 35 of water along the entire length of said stream.

In case for instance said light packets consist of, similar as described for FIG. 2, three sequential light pulses red, white, and blue, and one pulse of zero intensity, stationary, bands 45 to 48 with red, white and blue stripes will appear along the length of said stream 35. Depending of the velocity of the water emerging from outlet 34 the length of the individual multicolored stripes may reach several cm for light packets with duration of for instance 50 milliseconds. In case the light packets consist of a number of very short light pulses, of for instance 0.1 or 0.3 milliseconds or of any suitable duration, and each of for instance a different color, alternated with pulses of zero intensity of varied duration ranging from 5 to 10 milliseconds or more, said air bubbles will appear to the onlooker as momentarily lighted spots reminding of multicolored confetti inside said stream and dispersed along the length of the said stream.

As discussed for the embodiment of FIGS. 2 and 2*a* said microprocessor control device may be coupled to an input-output device to communicate external factors to the microprocessor to set the characteristics of the SPM light packets and the amount and pace of air bubbles introduced into said ornamental water stream. Hereby the ornamental laminar flow or low turbulent water stream constitutes an information carrier as from the light effects conclusions may be drawn regarding the external factors. Therefore a display for displaying any selected pattern is provided.

Figure 4:
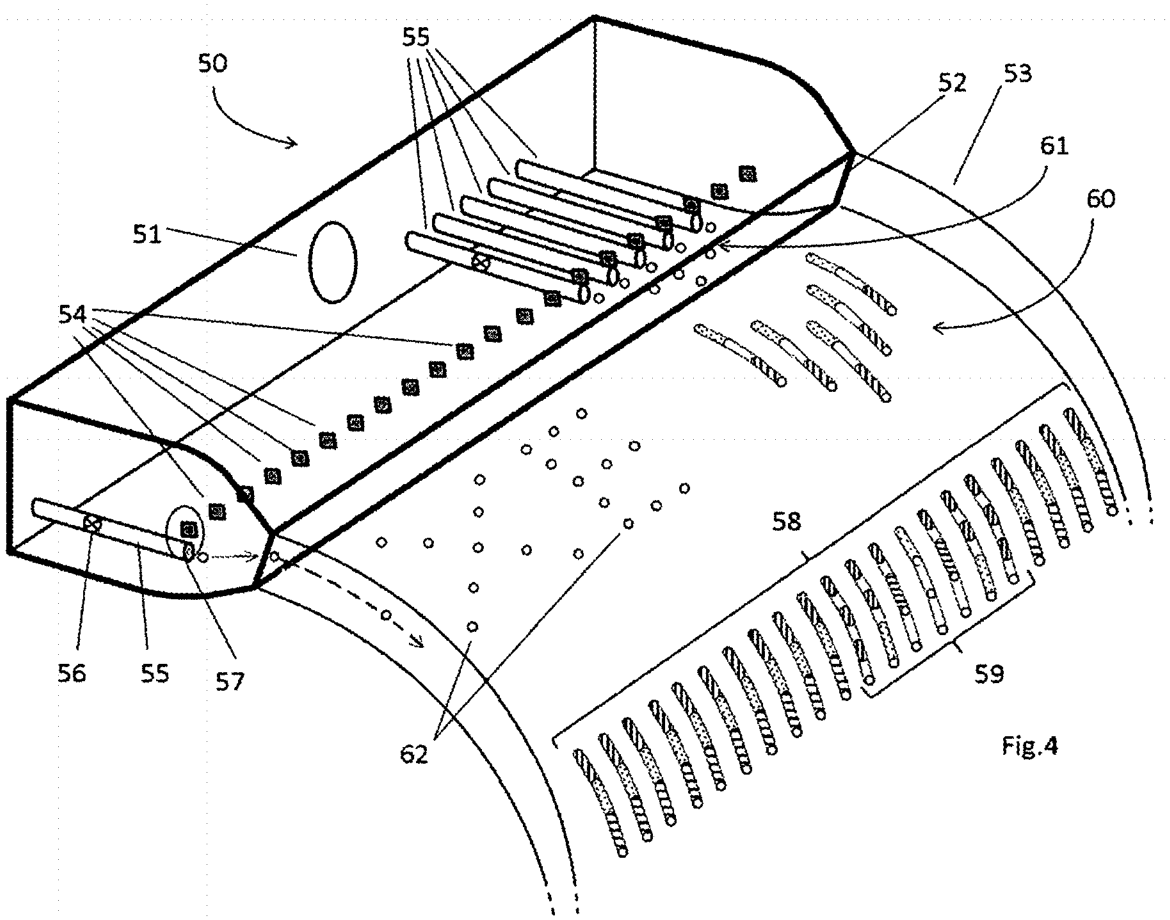
FIG. 4 is a diagram illustrating a view of a part of a fourth example of a device of the invention.

A further preferred embodiment of the invention is represented in FIG. 4, including a housing 50 with an inlet 51 and an elongate, horizontally oriented outlet 52, from which a cascade-like laminar flow or low turbulent water stream 53 is made to emerge into ambient atmosphere. An elongate array of light emitters 54—in FIG. 4 a total number of 21 is depicted—is mounted inside the housing 50 parallel to the horizontal axis of said outlet 52, emitting light into the water stream 53 to be guided by said stream by total internal reflection. In a preferred embodiment said light emitters 54 comprise one or more LED's, for instance a RGB-LED, a RGBY-LED or RGBW-LED, or one or more laser diodes. Associated with each light emitter 54 and located in close vicinity of said light emitter is an air tube 55 of reduced diameter, with only 6 tubes 55 being shown. Air bubbles may be introduced into the water stream 53 at a variable and adjustable pace, size, and amount as determined by a microprocessor control device operating for instance an air valve 56 within each air tube 55.

The combination 57 of light emitter 54 and air bubble supplier tube 55 is here referred to as CLEAT (Combination of Light Emitter and Air Tube) in this application. In a further preferred embodiment the light of each light emitter is collimated to the extend that it illuminates only those air bubbles, moving with the water inside said cascade-like water stream 53, that are emerging from the air tube associated with said light emitter, and, if desired, also from a number of neighboring air tubes. When the light emitters are made to emit light according to SPM as determined by the microprocessor control device light effects as discussed for the embodiment of FIGS. 1 to 3 may be generated for each individual CLEAT. Introducing equally sized air bubbles into the water stream synchronously and continuously for all CLEAT's and applying the same SPM pattern for all light emitters, stationary or moving multicolored bands 58 of lighted air bubbles—only one multicolored band is shown in FIG. 4—will appear due to the cinematographic effects inside the water cascade, to be observed by the onlooker. It will be clear that in case for a number of the CLEAT's within the array of CLEAT's alternative SPM patterns are generated, an alternative pattern, for instance pattern 59, will show within the multicolored bands 58 for the air bubbles of the CLEAT's involved. In case for each individual CLEAT time dependent SPM patterns are generated, images moving within the stationary multicolored bands 58 can be created in relation to said SPM patterns.

When the air bubbles are introduced into the water stream by a limited number of CLEAT's a-synchronously and/or intermittingly, that is according to preset and if desired time dependent patterns as for instance pattern 60 and 61, where pattern 61—identical to pattern 60—is just emerging and showing only its initial section, patterns of limited dimension, stationary or slowly or less slowly moving inside the water stream of the cascade, can be made. Said patterns of air bubbles that are introduced into the water stream may be made to take the form of for instance printed characters, whereby stationary readable texts, as for instance shown with respect to pattern 62 displaying 'XE' in FIG. 4, can be made to appear inside the cascade, to be observed and read by the onlooker, while also moving images like in a cinema may be produced.

As discussed for the embodiments of FIGS. 1 to 3 said microprocessor control device may be coupled to an input-output device to communicate external factors to the microprocessor to set the characteristics of the SPM light packets and the amount and pace of air bubbles introduced into said water cascade. Hereby the ornamental laminar flow or low turbulent water cascade constitutes an information carrier, as from the light effects created by SPM conclusions may be drawn regarding the external factors. If desired said information may be made to appear in readable characters inside said water cascade.

Figure 5:
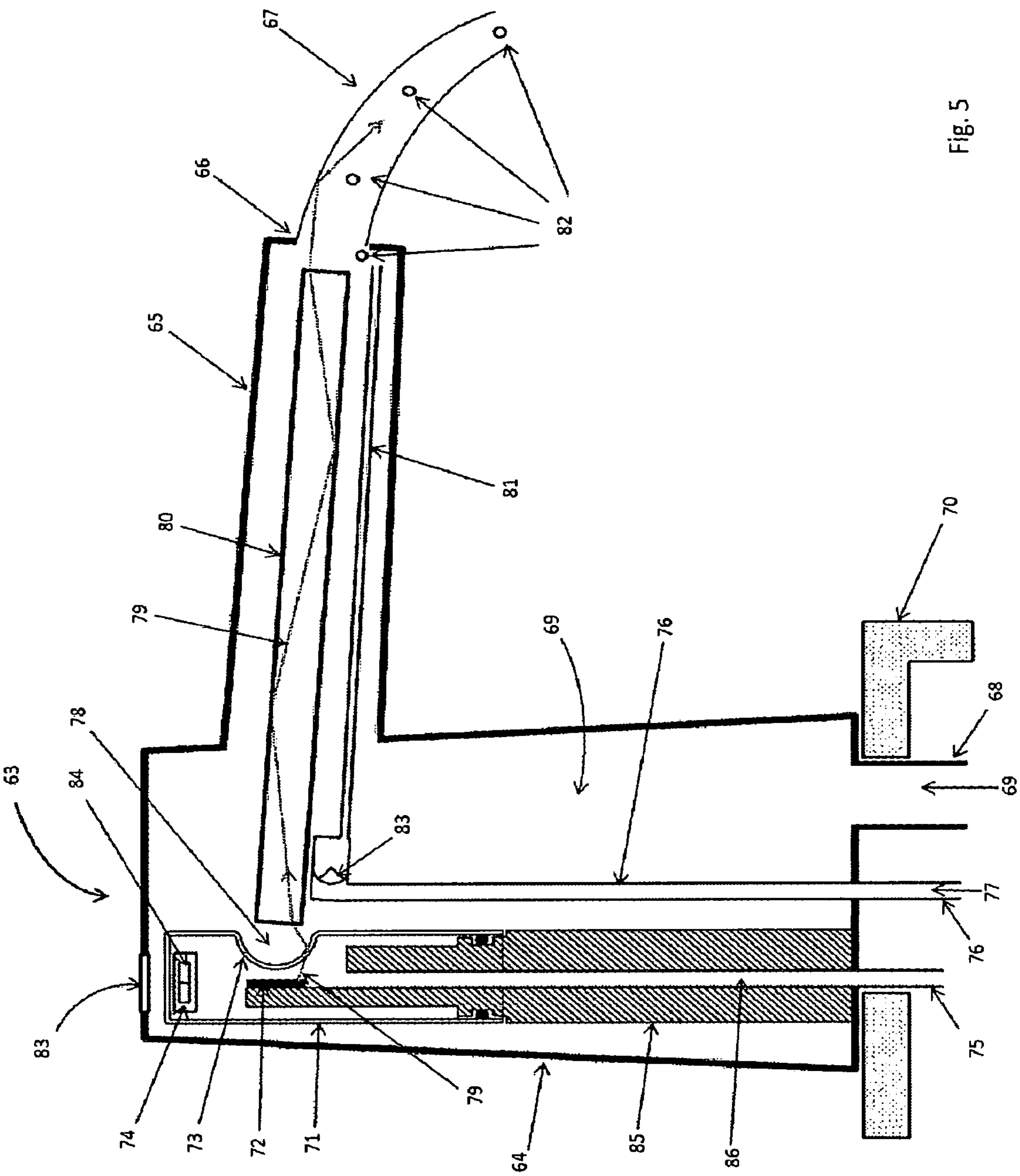
FIG. 5 is a diagram illustrating a view of a part of a fifth example of a device of the invention.

A fifth preferred embodiment of the invention is represented in FIG. 5. It comprises a sanitary faucet 63 mounted on a support 70, with said sanitary faucet 63 including a housing 64 that is equipped with a water inlet 68 through which water 69 enters said housing 64, and a water guiding means 65 with a water outlet 66, from which a laminar flow or low-turbulent water stream 67 is made to emerge into ambient atmosphere.

A light source 72, preferably a LED or a flat RGB-LED, is mounted on a support 85, said support 85 being made of a material with a high heat-conductivity like for instance copper, aluminum, or silver. The support 85 is for a part in contact with said water 69 and for an part equipped with a housing 71 made for at least a part of transparent material like glass or perspex. Said housing 71 is mounted onto said support 85 such that said housing 71 including the light source 72 is sealed from water 69 for instance by means of O-rings. Said support 85 comprises a channel 86 that extends to and below the lower side of housing 64 as indicated by 75, and in which channel 86 electrical wiring (not shown) can be introduced to activate and regulate the light source 72 by a microprocessor control device (not shown). Heat produced by the activated light source 72 will be conducted by said support 85 that is made of a material with a high heat-conductivity to the part of said support 85 that is in contact with the water 69 such that said heat will be dissipated into said water 69 with the result that said support 85 acts as a heat sink for light source 72.

The housing 71 is provided with a sphere like indenture 73 such that a hollow 78 is formed which is filled by water 69, whereby said hollow 78 is acting as a convergence lens. Light emitted from the light source 72 is by means of the water filled hollow 78 focused onto one end of a light guide 80 which is mounted into said water guiding means 65, with said light guide 80 extending towards and ending close to said outlet 66, guiding light rays as for instance light ray 79 emitted from said light source 72 to the other end of the light guide 80. From this other end of the light guide 80 light is emitted into said laminar flow or low turbulent water stream 67 with the respective said light rays 79 being guided by said water stream 67 by total internal reflection.

In said housing 64 an air tube 76 is arranged in which air tube an air flow 77 is introduced. Said air tube 76 connects to a compartment including a one-way air valve 83, and a second air tube 81 is connected to said compartment. The air tube 81 ends near the water outlet 66 so that air bubbles 82 are introduced into the water stream 67, which, in combination with light packets emitted by light source 72, similar as described for the embodiments of FIGS. 1 to 3, gives rise to multi-coloured stationary or moving patterns in said water stream. Said non-return air valve 83 is preferably positioned at a point above the air tubes 76 and 81 so that any water introduced into the air tube 81 will not pass said non-return air valve 83 and is driven out of the air tube 81 by the air flow 77.

Inside the housing 71 further detecting means 74 and 84 are mounted just opposite to the window 83. The detecting means 74 comprises an infrared emitter and infrared sensor or a capacitive sensor, while the detecting means 84 comprises an ambient light sensor. Not shown electric wiring for said detecting means 74 and 84 is accommodated in said channel 86. The detecting means 74 is coupled to a not shown input-output device communicating with a microprocessor (not shown) that sets the characteristics of the SPM light packets and the pace of air bubbles into said water stream 67. With the detecting means 74 the presence of an object or a body part, for instance a person's hand, close to a transparent window 87 within the housing 64 may be detected, by which information the microprocessor can be made to generate a new light pattern within the water stream 67. Alternatively said information can be used to activate an electric water valve (not shown), opening or closing it, whereby starting or stopping the water flow 67 emerging from outlet 66.

The detecting means 84 can comprise an ambient light sensor to generate information about the environmental lighting conditions as detected through the window 87. By means of said input-output device and microprocessor this information can be used to change the intensity of the light emitted by light source 72 on behalf of the light patterns. In daytime conditions the information of the ambient light sensor can be applied to increase the intensity of the light emitted by light source 72. In case the ambient light is low as for instance in evening or night conditions or in artificial lighting conditions said information of the ambient light sensor can be used to decrease the intensity of the light emitted by light source 72. In this way the intensity of light source 72 can be adapted to the environmental lighting conditions.

The features disclosed in the claims, the specification and the figures, taken separately or in any combination, may be important for the claimed invention in its respective different embodiments.

| | |
|---|---|
| 1 | housing |
| 2 | water inlet |
| 2a | water valve |
| 3 | water outlet |
| 4 | water stream |
| 5 | baffle |
| 6 | light source |
| 7 | light guide |
| 7a | light emitting end |
| 8 | guided light ray |
| 9 | air introduction means |
| 10 | air bubble |
| 11 | deflected light ray |
| 12 | microprocessor control device |
| 13 | interface |
| 14 | air tube |
| 15 | air valve |
| 17 | air bubble |
| 18 | air bubble |
| 19 | air bubble |
| 20 | light pulse |
| 21 | light pulse |
| 22 | light pulse |
| 23 | intensity |
| 24 | light packet |
| 25 | light packet |
| 26 | multicolored line |
| 27 | multicolored line |
| 28 | time |
| 29 | no light |
| 33 | housing |
| 34 | water outlet |
| 35 | water stream |
| 36 | light emitter |
| 37 | air valve |
| 38 | air tube |
| 39 | air bubble |
| 40 | air bubble |
| 41 | air bubble |
| 42 | air bubble |
| 43 | air bubble |
| 45 | multicolored line |
| 46 | multicolored line |
| 47 | multicolored line |
| 48 | multicolored line |
| 50 | housing |
| 51 | water inlet |
| 52 | water outlet |
| 53 | water stream |
| 54 | light emitter |
| 55 | air tube |

-continued

| | |
|---|---|
| 56 | air valve |
| 57 | combination of light emitter and air bubble supply tube (CLEAT) |
| 58 | multicolored band |
| 59 | alternative multicolored band |
| 60 | air bubble pattern |
| 61 | air bubble pattern |
| 62 | air bubble pattern |
| 63 | sanitary faucet |
| 64 | housing |
| 65 | water guiding means |
| 66 | outlet |
| 67 | water stream |
| 68 | water inlet |
| 69 | water |
| 70 | support |
| 71 | housing |
| 72 | light source |
| 73 | indenture |
| 74 | IR emitter and sensor |
| 75 | lower housing side |
| 76 | air tube |
| 77 | air flow |
| 78 | hollow |
| 79 | light ray |
| 80 | light guide |
| 81 | air tube |
| 82 | air bubbles |
| 83 | valve |
| 84 | light sensor |
| 85 | support |
| 86 | channel |
| 87 | window |

What is claimed is:

1. A method for providing a liquid display displaying a selectable pattern, comprising:

selecting a pattern;

generating an adjustable liquid stream defined by a boundary along its path; and emitting light rays emitted from a first emitter and light deflecting means consisting of gas bubbles, preferably air bubbles or small particles from a second emitter into said liquid stream along its path and depending on the selected pattern such that each light ray within the liquid stream is guided by total reflection at the boundary of said liquid stream until impacting a light deflecting means by which the light ray is deflected in order to leave the liquid stream as deflected light rays, and that the deflected light rays form the selected pattern, wherein the light rays emitted from the first emitter are characterized by at least one light parameter, with the light parameter being defined by at least one of:

a first light parameter defining the light rays as such, consists at least one of the frequency and amplitude of the light; and a second light parameter defining the emission of the light rays, consists of duration and repetition rate of emission pulses of the light rays; and wherein the light deflecting means emitted from the second emitter depend on the light parameter such that the emitted light deflecting means are tuned to the emitted light rays to create cinematographic light effects, or the light deflecting means emitted by the second emitter are characterized by at least one deflecting parameter, with the deflecting parameter being defined by at least one of:

a first deflecting parameter defining the deflecting means as such, consists at least one of the material size, geometry, weight, amount, density, velocity, acceleration and/or kind of gas or solid material; and a second deflecting parameter defining the emission of the deflecting means, consists location, repetition rate, width and form of emission pulses of the light deflecting means; and the light rays emitted from the first emitter depending on the deflecting parameter such that the emitted light rays are tuned to the emitted light deflecting means to create cinematographic light effects.

2. The method according to claim 1, wherein at least the liquid stream is generated as a substantial laminar flow liquid stream or low turbulent liquid stream, preferably in form of a water stream, and the liquid stream is characterized by at least one liquid parameter, with at least one of the light rays emitted from the first emitter and light deflecting means emitted from the second emitter depending on the liquid parameter.

3. The method according to claim 2, wherein the liquid parameter is defined by sensors sensing the liquid flow rate, the liquid temperature, the pH value of the liquid, the content of chemical or organic substances within the liquid, or micro organisms, or the kind of liquid.

4. The method according to claim 1, wherein at least one of the light parameter is at least one of adjustable and selectable, and the deflecting parameter is at least one of adjustable and selectable.

5. The method according to claim 1, wherein at least one first emitter emits the light rays in form of series of light packets, preferably said series of light packets consisting of two or more sequential light pulses with different light parameters, of which in particular at least one light pulse has an intensity greater than zero and at least one of said light pulses has at least one of a color and intensity different from the other light pulse(s).

6. The method according to claim 1, wherein at least one second emitter emits light deflecting means, in particular comprising at least one of gas bubbles and particles in the form of series of packets, preferably said series of light deflecting means packets comprising two or more sequential light deflecting means pulses differing with respect to their deflecting parameters.

7. The method according to claim 5 or 6, wherein the first emitter and the second emitter are synchronized.

8. The method according to one of the preceding claims 1-6, wherein the pattern is selected manually or automatically, preferably depending on at least one environment parameter being characteristic for the environment consisting of lighting conditions, weather conditions, temperature of ambient atmosphere, atmospheric pressure, wind speed, air pollution, water pollution, sounds, noise levels or characteristic for information about location, presence; or movement of physical bodies or persons, or characteristic for time consisting the time of day, the week, the month, the year, the season or characteristic for information consisting of stock exchange data, rise or fall of a stock exchange index consisting of Dow Jones, DAX, or AEX, or characteristic for data retrieved through wired or wireless communication systems, WIFI, or LAN.

9. A device for providing a liquid display, comprising:

at least one liquid outlet, preferably comprising at least one of a water faucet, a plumbing fixture, an ornamental fountain or ornamental water display;

at least one light emitter, preferably comprising one or more Light Emitting Diodes (LEDS), or one or more multi colored LEDs, or a RGB-LED, or at least one of one or more laser diodes and an array of light emitters;

at least one emitter of light deflecting means;

an input device; and a control unit coupled to the liquid outlet, the light emitter, the emitter of light deflecting means and the input device and adapted to provide the liquid display displaying a selectable pattern with the method according to claim 1.

10. The device according to claim 9, wherein the liquid outlet comprises a nozzle, valve, filter, baffle and synchronizing means, and/or the light from the light emitter is adapted by a filter, optic element, or chopper and synchronizing means, and the light deflecting means are adapted by a valve.

11. The device according to claim 9 or 10, further comprising at least one of at least one first sensor for determining the light parameter; at least one second sensor for determining the deflecting parameter; at least one third sensor for determining the liquid parameter; at least one fourth sensor for determining the environment parameter, wherein preferably at least one of the first, second, third and fourth sensor is connected to said control unit.

12. The device according to claim 11, wherein at least one of the input device comprises at least one of manual switches, a keypad and a touch screen; the input device is suited to communicate wireless, via at least one of WIFI, LAN, Bluetooth, Zigbee, smart phone and tablet applications (apps), and the input device receives data from at least one of the first, second, third and fourth sensor, and the control unit comprises a microprocessor with an interface comprised by the input device.

13. The device according to one of claim 9, 10 or 12, wherein the liquid outlet being provided at the end of a liquid guiding means determines the flow characteristic of the liquid stream, and the light emitter as well as the light deflecting means emitter are arranged to emit light and light deflecting means, respectively, within the liquid guiding means, upstream of the liquid outlet, with preferably at least one part of at least one of the light emitter and light deflecting means emitter being arranged inside the liquid guiding means.

14. The device according to one of claim 9, 10 or 12, wherein the light emitter is mounted in a housing, the housing comprising wall which is at least in part transparent, the transparent wall part is providing an indenture, the indenture provides a hollow that is filled with water to act as a converging lens focusing light rays from light emitter onto a light guide.

15. The device according to one of claim 9, 10 or 12, wherein at least one of the light parameter, in particular the intensity of the light rays emitted by light emitter, is controlled in dependence of the output of a light sensor, and the light parameter, the deflecting parameter and/or the liquid parameter, in particular determining the pattern of the light rays emitted by light emitter is controlled in dependence of the output of an infrared emitter and sensor or a capacitive sensor.

16. The device according to one of claim 9, 10 or 12, wherein the liquid outlet being provided at the end of a liquid guiding means determines the flow characteristic of the liquid stream, and the light emitter as well as the light deflecting means emitter are arranged to emit light and light deflecting means, respectively, within the liquid guiding means, upstream of the liquid outlet, with preferably at least one part of at least one of the light emitter and light deflecting means emitter being arranged inside the liquid guiding means;

wherein the liquid guiding means has a wall which is at least in part transparent for environmental light, wherein at least one of the light parameter, in particular the intensity of the light rays emitted by light emitter, is controlled in dependence of the output of a light sensor, and the light parameter, the deflecting parameter and/or the liquid parameter, in particular determining the pattern of the light rays emitted by light emitter is controlled in dependence of the output of an infrared emitter and sensor or a capacitive sensor, and at least one of the light sensor and the infrared emitter and sensor is/are arranged to receive environmental light through the transparent wall part.

17. The device according to claim 9, further comprising at least one of at least one first sensor for determining the light parameter; at least one second sensor for determining the deflecting parameter; at least one third sensor for determining the liquid parameter; at least one fourth sensor for determining the environment parameter, wherein preferably at least one of the first, second, third and fourth sensor is connected to said control unit; wherein at least one of the input device comprises at least one of manual switches, a keypad and a touch screen; the input device is suited to communicate wireless, via at least one of WIFI, LAN, Bluetooth, Zigbee, smart phone and tablet applications (apps), and the input device receives data from at least one of the first, second, third and fourth sensor, and the control unit comprises a microprocessor with an interface comprised by the input device.

18. The device according to claim 10, further comprising at least one of at least one first sensor for determining the light parameter; at least one second sensor for determining the deflecting parameter; at least one third sensor for determining the liquid parameter; at least one fourth sensor for determining the environment parameter, wherein preferably at least one of the first, second, third and fourth sensor is connected to said control unit; wherein at least one of the input device comprises at least one of manual switches, a keypad and a touch screen; the input device is suited to communicate wireless, via at least one of WIFI, LAN, Bluetooth, Zigbee, smart phone and tablet applications (apps), and the input device receives data from at least one of the first, second, third and fourth sensor, and the control unit comprises a microprocessor with an interface comprised by the input device.

* * * * *